(12) United States Patent
Oi et al.

(10) Patent No.: US 7,275,625 B2
(45) Date of Patent: Oct. 2, 2007

(54) DISK BRAKE PAD

(75) Inventors: Nobuyuki Oi, Nagoya (JP); Katsuaki Ishii, Nishikamo-gun (JP); Yuichi Takeo, Toyota (JP)

(73) Assignee: Advics Co., Ltd., Aichi-pref. (JP)

( * ) Notice: Subject to any disclaimer, the term of this patent is extended or adjusted under 35 U.S.C. 154(b) by 0 days.

(21) Appl. No.: 10/896,334

(22) Filed: Jul. 22, 2004

(65) Prior Publication Data
US 2005/0023091 A1    Feb. 3, 2005

(30) Foreign Application Priority Data
Jul. 28, 2003    (JP) .................... 2003-280813

(51) Int. Cl.
*F16D 65/04* (2006.01)

(52) U.S. Cl. .................... 188/250 B; 188/250 G; 188/261

(58) Field of Classification Search ......... 188/218 XL, 188/250 R, 250 G, 250 B, 261, 73.1
See application file for complete search history.

(56) References Cited

U.S. PATENT DOCUMENTS 4,220,223 A * 9/1980 Rinker et al. ............. 188/73.1
4,485,898 A * 12/1984 Bracken et al. ........... 188/250 B
5,145,037 A * 9/1992 Kobayashi et al. ........ 188/73.1
5,443,133 A * 8/1995 Dreilich et al. .......... 188/250 G
5,535,859 A * 7/1996 Zeng .................... 188/250 B

FOREIGN PATENT DOCUMENTS

JP    Y2-7-23650    5/1995
JP    Y2-2589510    11/1998

* cited by examiner

*Primary Examiner*—Melody M. Burch
(74) *Attorney, Agent, or Firm*—Posz Law Group, PLC

(57) ABSTRACT

A disk brake pad controls rotation of a disk rotor by pushing a friction surface against the disk rotor while it is rotating. The disk brake pad is formed with respective chamfered portions at respective end portions of the disk brake pad at the incoming and outgoing disk-rotor-rotation sides thereof. An edge of an end portion of the friction surface of the disk brake pad at the incoming disk-rotor-rotation side, and an edge of an end portion at the outgoing disk-rotor-rotation side are formed in a stepped bending shape such that a length of the friction surface in a circumferential direction of the disk rotor becomes shorter in a center of rotation direction of the disk rotor.

11 Claims, 11 Drawing Sheets

DISK BRAKE PAD

CROSS REFERENCE TO RELATED APPLICATION

This application is based upon and claims the benefit of Japanese Patent Application No. 2003-280813 filed on Jul. 28, 2003, the content of which are incorporated herein by reference.

FIELD OF THE INVENTION

The present invention relates to a disk brake pad that controls rotation of a disk rotor by pushing a friction surface against the disk rotor while it is rotating.

BACKGROUND OF THE INVENTION

Generally, disk brake pads are formed by mixing a fiber material such as organic fiber, inorganic fiber, or metal fiber, with a powdered material such, as a friction control agent or filler, and a binding agent such as a binder resin like phenol resin; and then thermoforming the mixed material composition thereof.

When this type of disk brake pad is used, a friction surface of the disk brake pad is pushed against a rotating disk rotor, whereby rotation of the disk rotor is controlled by friction action of the friction surface. Accordingly, a braking action is achieved.

FIGS. 9A and 9B shows the configuration of a conventional disk brake pad 900; FIG. 9A shows a schematic plan view of the disk brake pad 900 when viewed from the side of a friction surface 10 thereof; and FIG. 9B shows a side view of the disk brake pad 900 as viewed from the bottom of FIG. 9A.

As can be seen from FIGS. 9A and 9B, the disk brake pad 900 is formed as an integral unit with a back plate 200, and is connected to the back plate 200 by a face that is opposite a friction surface 10. Note that, the arrow Y1 indicates a rotation direction of a disk rotor, not shown, namely, a circumferential direction of the disk rotor.

In FIG. 9A, the long-dash dot line K indicates a central axis of the friction surface 10 that extends in radial direction of the disk rotor. Further, the arrow Y2 that is marked at the lower end of the long-dash dot line K indicates a direction toward a center of rotation of the disk rotor.

Hereinafter, the direction indicated by the arrow Y1 will be referred to as the "disk rotor circumferential direction Y1". Further, the long-dash dot line K will be simply referred to as the "central axis K1" of the friction surface 10, and the direction indicated by the arrow Y2 will be referred to as the "disk rotor rotation center direction Y2".

Conventionally, in order to improve brake noise performance of disk brakes, namely, to reduce brake noise (hereinafter referred to as "improved brake noise performance), the disk brake pad 900 with the configuration shown in FIGS. 9A and 9B, which allows pad surface contact pressure to be regulated, has been proposed. Such a disk brake pad is disclosed, for example, in Japanese Examined Utility Model Publication H7-23650 and Japanese Utility Model No. 2589510. With this disk brake pad 900, respective chamfered portions J10 are provided at an end portion of the disk brake pad 900 at an incoming disk-rotor-rotation side thereof (namely, a leading side), and an end portion of the disk brake pad 900 at the outgoing disk-rotor-rotation side thereof (namely, a trailing side).

Since the chamfered portions J10 are formed as described, edges 11 and 12 are respectively formed at the boundary edge of the friction surface 10 and the chamfered portions J10. These edges 11 and 12 are respective edges of end portions of the friction surface 10.

If the respective end portions of the disk brake pad 900 at the incoming and outgoing disk-rotor-rotation sides come into contract with the disk rotor, the surface contact pressure of these end portions is increased, whereby brake noise also increases. However, with the above disclosed configuration, the end portions of the disk brake pad 900 are chamfered so that contact of the end portions with the disk rotor reduces. Accordingly, it is possible to inhibit the generation of brake noise.

With the configuration shown in FIGS. 9A and 9B in which both end portions of the disk brake pad 900 are chamfered, the chamfering is performed such that a length of the friction surface 10 in the disk rotor circumferential direction Y1 remains substantially the same in the disk rotor rotation center direction Y2 (namely, the central axis K of the friction surface 10). When the disk brake pad 900 is configured in this manner, it is possible to realize improved brake noise performance.

However, as the friction surface 10 becomes worn along with usage of the disk brake pad 900, the percentage of the friction surface 10 that is accounted for by the chamfered portion J10 reduces, as shown by the dashed line in FIG. 9B. Thus, the noise reduction effectiveness of the chamfered portion J10 is gradually diminished, whereby brake noise reduction performance worsens.

Further, if wear of the disk brake pad 900 in the disk rotor rotation center direction Y2 (namely, the central axis K of the friction surface 10) is uneven, then brake noise reduction performance deteriorates even more.

FIG. 10 illustrates an explanation of why such uneven wear occurs. More specifically, FIG. 10 is a schematic view showing why uneven wear of the disk brake pad 900 occurs in the disk rotor rotation center direction Y2.

One of the causes of the uneven wear in the disk rotor rotation center direction Y2 of the friction surface 10 is a difference in work per unit area between a portion of the friction surface 10 that is closer to the disk rotor rotation center and a portion of the friction surface 10 that is farther from the disk rotor rotation center.

In other words, as shown in FIG. 10, a peripheral speed of the portion far from the disk rotor rotation center (an external periphery portion of the disk rotor) is faster than that of the portion close to the disk rotor rotation center (an inner peripheral portion of the disk rotor). Accordingly, the work of the external periphery portion of the disk rotor is higher.

Thus, the portion of the friction surface 10 of the disk brake pad 900 that comes into contact with external periphery portion of the disk rotor wears more than the portion of the friction surface that comes into contact with the inner periphery portion of the disk rotor. As a result, uneven wear of the disk brake pad 900 occurs, which causes the thickness of the disk brake pad 900 to become uneven. In other words, the portion of the disk brake pad 900 that is close to the disk rotor rotation center is thicker than the portion that is far from the disk rotor rotation center. In this way, uneven wear results from the work difference of the external and inner periphery portions of the disk rotor.

In addition, another cause of uneven wear is variation in pad surface contact pressure per unit area of the inside of the friction surface 10, which is caused by cylinder deformation that results from application of high hydraulic pressure.

FIG. 11 shows two of the disk brake pads 900, which have been assembled to a brake. The disc brake pads 900 are respectively positioned at an inside and an outside of a disk rotor 300.

For explanatory purposes, the disk brake pad 900 positioned to the inside of the disk rotor 300 will be called the "inner pad", and the disk brake pad 900 at the outside of the disk rotor 300 will be called the "outer pad".

In the brake shown, a piston 400 is moved by hydraulic pressure in the direction to the right of FIG. 11, whereby the inner pad 900 is pushed against the disk rotor 300. At the same time, a cylinder 500 is moved in the direction to the left of FIG. 11, whereby the outer pad 900 is pressed against the disk rotor 300.

FIG. 11 shows a state in which the outer pad 900 and the inner pad 900 have been pushed against the disk rotor 300 by the cylinder 500 and the piston 400, respectively. In this case, the above described uneven wear of the disk brake pads 900 has not occurred.

Note that, in FIG. 11, the reference numeral 600 is a mounting. This mounting 600 is a portion that is mounted to a vehicle, and is configured such that it acts as a braking torque receiving member. Further, a seal 700 is disposed between the piston 400 and the cylinder 500.

According to the brake mentioned above, when a fluid pressure, namely, the aforementioned hydraulic pressure, of the brake is high due to sudden braking or the like (in other words, the forces with which the cylinder 500 and the piston 400 push the disk brake pads 900 are strong), a pad surface contact pressure per unit area of the outer pad 900 in FIG. 11 becomes larger toward the external periphery portion side of the disk rotor 300 than the inner periphery portion side thereof.

This variation in pad surface contact pressure per unit area results from the fact that, amongst the area of the cylinder 500 that comes into contact with the outer pad 900, a region of the cylinder 500 that is located toward the inner periphery side of the disk rotor 300 is deformed more substantially than a region that is located toward the outer periphery side of the disk rotor 300. Accordingly, wear of the disk brake pad 900 occurs unevenly along the disk rotor rotation center direction Y2.

In this way, uneven wear of the disk brake pad 900 is caused by various factors such as (i) difference in the work of the outer periphery portion and the inner periphery portion of the disk rotor, and (ii) variation in the pad surface contact pressure of the inside of the friction surface 10 caused by low fluid pressure of the brake when braking gently.

Moreover, FIG. 12 shows the assembled brake of FIG. 11, in which uneven wear of the disk brake pads 900 has occurred.

When uneven wear of the disk brake pads 900 occurs as shown, the disk brake pads 900 are held less firmly by the cylinder 500 and the piston 400. Thus, when brake hydraulic pressure is low, the behavior of the disk brake pads 900 becomes unstable, which leads to the generation of brake noise.

To address these problems, as shown in FIGS. 13A and 13B, a configuration can be proposed in which the end portion of disk brake pad 900 at the incoming disk-rotor-rotation side and the end portion at the outgoing disk-rotor-rotation side are formed with respective chamfered portions J11, such that the friction surface 10 is formed with a fan-shape.

With this configuration, an external periphery portion of the fan-shaped friction surface 10 becomes the portion that is far from the disk rotor rotation center, and an inner periphery portion of the fan-shaped friction surface 10 becomes the portion that is close to the disk rotor rotation center.

Accordingly, the length of the friction surface 10 in the disk rotor circumferential direction Y1 becomes shorter in the disk rotor rotation center direction Y2 (namely, the central axis K of the friction surface 10).

Adoption of this fan-shaped friction surface 10 helps to promote both even distribution of work across the friction surface 10, and equal pad surface contact pressure per unit area in the disk rotor rotation center direction Y2 (namely, the central axis K of the friction surface 10). Accordingly, this configuration can be expected to reduce uneven wear of the disk brake pad 900.

However, when the disk brake pad 900 is configured with the fan-shaped friction surface 10 as shown in FIGS. 13A and 13B, it is necessary to make an angle θ (refer to FIG. 13A) large in order that the fan-shaped configuration is amply effective.

This angle θ is an angle formed between (i) the respective edges 11 and 12 of end portions of the friction surface 10 at the incoming and outgoing disk-rotor-rotation sides and (ii) the central axis K. Note that, in FIG. 13A, the angle θ is indicated as an angle formed between (i) the edges 11 and 12 of the friction surface 10 and (ii) respective axes K' that are parallel to the central axis K of the friction surface 10. However, this angle is definitionally equivalent to the first definition of the angle θ above.

If the angle θ is made larger in this way, it is clearly apparent that the surface area of the entire friction surface 10 must be made smaller. This reduction in surface area leads the life of the disk brake pad 900 to become shorter due to an increase in wear thereof.

SUMMARY OF THE INVENTION

It is an object of the present invention to provide a disk brake pad that controls rotation of a disk rotor by pushing a friction surface against the disk rotor while it is rotating. This disk brake pad helps to promote long pad-life and inhibits uneven pad-wear from occurring in a disk rotor rotation center direction.

According to a first aspect of the present invention, a disk brake pad controls rotation of a disk rotor by pushing a friction surface against the disk rotor while it is rotating. The disk brake pad is formed with respective chamfered portions at respective end portions of the disk brake pad at the incoming and outgoing disk-rotor-rotation sides thereof. The disk brake pad has the following characteristics:

An edge of an end portion of the friction surface of the disk brake pad at an incoming disk-rotor-rotation side, and an edge of an end portion of the disk brake pad at the outgoing disk-rotor-rotation side are formed in a stepped bending shape such that a length of the friction surface in a circumferential direction of the disk rotor becomes shorter toward a center of rotation of the disk rotor.

With this configuration, the length of the friction surface in the circumferential direction of the disk rotor becomes smaller toward the disk rotor rotation center. Accordingly, this disk brake pad, like the disk brake pad described previously (refer to FIG. 13A), is formed such that the friction surface has a fan-shape. Thus, the disk brake pad of the present invention can facilitate even distribution of work across the friction surface in a disk rotor rotation center direction.

Further, the respective edges of the end portions of the friction surface at the incoming and outgoing disk-rotor-rotation sides are formed in the stepped bending shape. Accordingly, as compared to the above described fan-shaped configuration in which the edges of the respective end portions are straight lines, the disk brake pad according to the first aspect of the present invention has a wider surface area at a portion (which is subject to comparatively severe wear) that is far from the disk rotor rotation center.

Thus, the disk brake pad according to first aspect of the present invention effectively helps to promote long pad-life and inhibits uneven pad-wear from occurring in the disk rotor rotation center direction.

According to a second aspect of the present invention, a disk brake pad controls rotation of a disk rotor by pushing a friction surface against the disk rotor while it is rotating. The disk brake pad is formed with respective chamfered portions at respective end portions of the disk brake pad at the incoming and outgoing disk-rotor rotation sides. The disk brake pad has the following characteristics:

An edge of an end portion of the friction surface at the incoming disk-rotor-rotation side and an edge of an end portion of the friction surface at the outgoing disk-rotor-rotation side are formed in a stepped bending shape.

The edges that form the stepped bending shape have bend angles formed between respective straight lines of the edges and a central axis of the friction surface that extends in radial direction of the disk rotor. Moreover, when these angles are defined as being respective bend angles ($\alpha$, $\beta$, and $\gamma$), the bend angles are set such that the bend angle formed nearer to a center of rotation of the disk rotor is larger than the bend angle formed farther from the center of rotation of the disk rotor.

Accordingly, like the disk brake pad according to the first aspect, the second aspect embodies a configuration in which the length of the friction surface in the circumferential direction of the disk rotor becomes smaller toward the disk rotor rotation center.

Thus, the disk brake pad according to the second aspect of the present invention can facilitate even distribution of work across the friction surface in a disk rotor rotation center direction.

Further, with the disk brake pad according to the second aspect of the present invention as well, the respective edges of the end portions of the friction surface at the incoming and outgoing disk-rotor-rotation sides are formed in the stepped bending shape. Accordingly, the surface area of the friction surface at the portion that is far from the disk rotor rotation center, which is subject to comparatively severe wear, can be made wider.

Thus, the disk brake pad according to the second aspect of the present invention effectively helps to promote long pad-life and inhibits uneven pad-wear from occurring in the disk rotor rotation center direction.

Note that, it is favorable if the bend angles are set at ninety degrees or less.

Moreover, the above aspects may be configured such that the stepped bending shape is formed as a two-step bending shape formed by a first set of straight lines and a second set of straight lines. In other words, a single bend point configuration may be adopted.

According to a third aspect of the present invention, a disk brake pad controls rotation of a disk rotor by pushing a friction surface against the disk rotor while it is rotating. The disk brake pad is formed with respective chamfered portions at respective end portions of the disk brake pad at the incoming and outgoing disk-rotor-rotation sides thereof. The disk brake pad has the following characteristics:

An edge of an end portion of the friction surface at the incoming disk-rotor-rotation side and an edge of an end portion of the friction surface at the outgoing disk-rotor-rotation side are formed in a stepped bending shape that is formed from two pairs of straight lines. This stepped bending shape is formed such that a length of the friction surface in a circumferential direction of the disk rotor becomes shorter toward a center of rotation of the disk rotor.

When, among the two pairs of straight lines, the straight lines farther from the center of rotation of the disk rotor are defined as being a first set of straight lines, and the straight lines nearer to the center of rotation of the disk rotor are defined as being a second set of straight lines, a first angle ($\alpha$) formed between the first set of straight lines and a central axis of the friction surface that extends in radial direction of the disk rotor is set to be smaller than a second angle ($\beta$) formed between the second set of straight lines and the central axis of the friction surface.

Note that, the characteristics of the third aspect of the present invention differ with respect to those of the second aspect with respect to the fact that a single bend point configuration is adopted.

Accordingly, with the disk brake pad as configured in the third aspect, it is possible to effectively promote long pad-life and inhibit uneven pad-wear from occurring in the disk rotor rotation center direction.

Note that, the third aspect may be configured such that the first angle is set within a range between zero and forty-five degrees, and the second angle is set within a range between four-five and eighty degrees.

According to a fourth aspect of the present invention, a disk brake pad controls rotation of a disk rotor by pushing a friction surface against the disk rotor while the disk rotor is rotating. The friction surface of this disk brake pad is formed in a fan-shape. An inner periphery side portion of the fan-shape that is formed by respective edges of respective end portions in a circumferential direction of the friction surface is provided with chamfered portions. These chamfered portions are chamfered such that a length of the friction surface across the inner peripheral side portion of the fan-shape becomes shorter in the circumferential direction.

Accordingly, with the configuration of the fourth aspect of the present invention, like the first aspect of the present invention, the disk brake pad with the fan-shaped friction surface embodies a configuration in which the length of the friction surface in the circumferential direction of the disk rotor becomes smaller toward a disk rotor rotation center.

Thus, the disk brake pad according to the fourth aspect of the present invention can facilitate even distribution of work across the friction surface in a disk rotor rotation center direction.

It should be noted that, the fourth aspect of the present invention is provided with the chamfered portions at the inner periphery side portion of the fan-shape formed by the respective edges of the end portions in the circumferential direction of the friction surface such that the length of the friction surface across the inner peripheral side portion of the fan-shape becomes shorter in the circumferential direction. Accordingly, with the configuration of the fourth aspect, there is no need to provide chamfered portions at an external periphery side portion of the fan-shaped.

Accordingly, with this configuration, the surface area of the friction surface at the external periphery side portion of the fan-shape, namely, the portion that is farther from the disk rotor rotation center and which is subject to comparatively severe wear, can be made wider.

Accordingly, with the disk brake pad as configured in the fourth aspect of the present invention, it is possible to effectively promote long pad-life and inhibit uneven pad-wear from occurring in the disk rotor rotation center direction.

Note that, it is favorable if respective edges of the chamfered portions are formed as a single straight-line, an angle (α) formed between (i) straight lines which are located at a portion that is farther to an external periphery side of the fan-shape than the respective chamfered portions and which form part of the edges of the respective end portions of the friction surface in the circumferential direction, and (ii) a central axis of the friction surface that extends in radial direction of the fan-shape may be defined as a first angle. Further, an angle (β) formed between (i) straight lines that form the edges of the chamfered portions and (ii) the central axis of the friction surface that extends in radial direction of the fan-shape may be defined as a second angle (β). Given these definitions of the first and second angles (α and β), it is favorable if the first angle is set to be smaller than the second angle.

Accordingly, with the brake pad with the friction surface formed in the fan-shape, it is possible to form the respective edges of the end portions in the circumferential direction of the friction surface so that they have a two-step bending shape.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

Figure 1A:
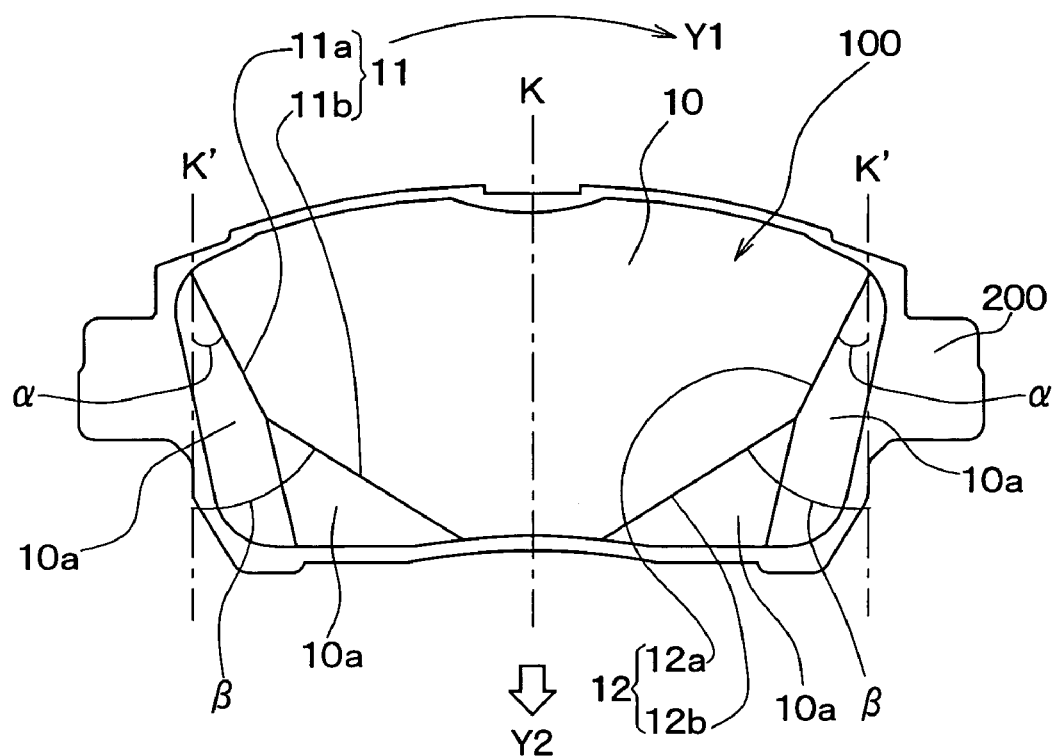
FIG. 1A is a schematic plane view showing the configuration of a disk brake pad according to a first embodiment of the present invention.

The present invention will be described further with reference to various embodiments in the drawings.

First Embodiment

Figure 1B:
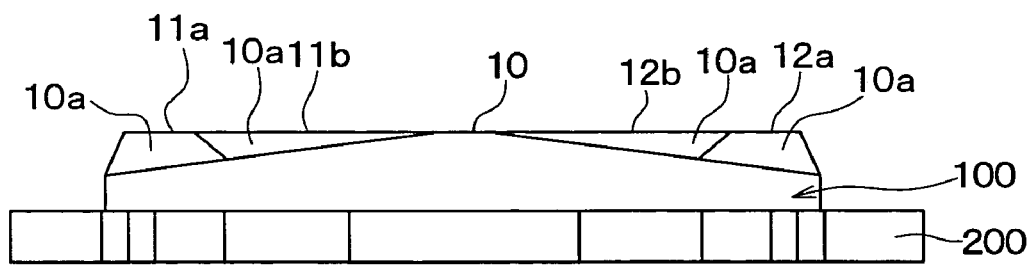
FIG. 1B is a side view as viewed from the bottom of FIG. 1A.

FIGS. 1A and 1B show the configuration of a disk brake pad 100 according to a first embodiment of the present invention. FIG. 1A shows a schematic plan view of the disk brake pad 100 as viewed from a front side of a friction surface 10 thereof, and FIG. 1B shows a side view of the disk brake pad 100 as viewed from the bottom of FIG. 1A.

Figure 11:
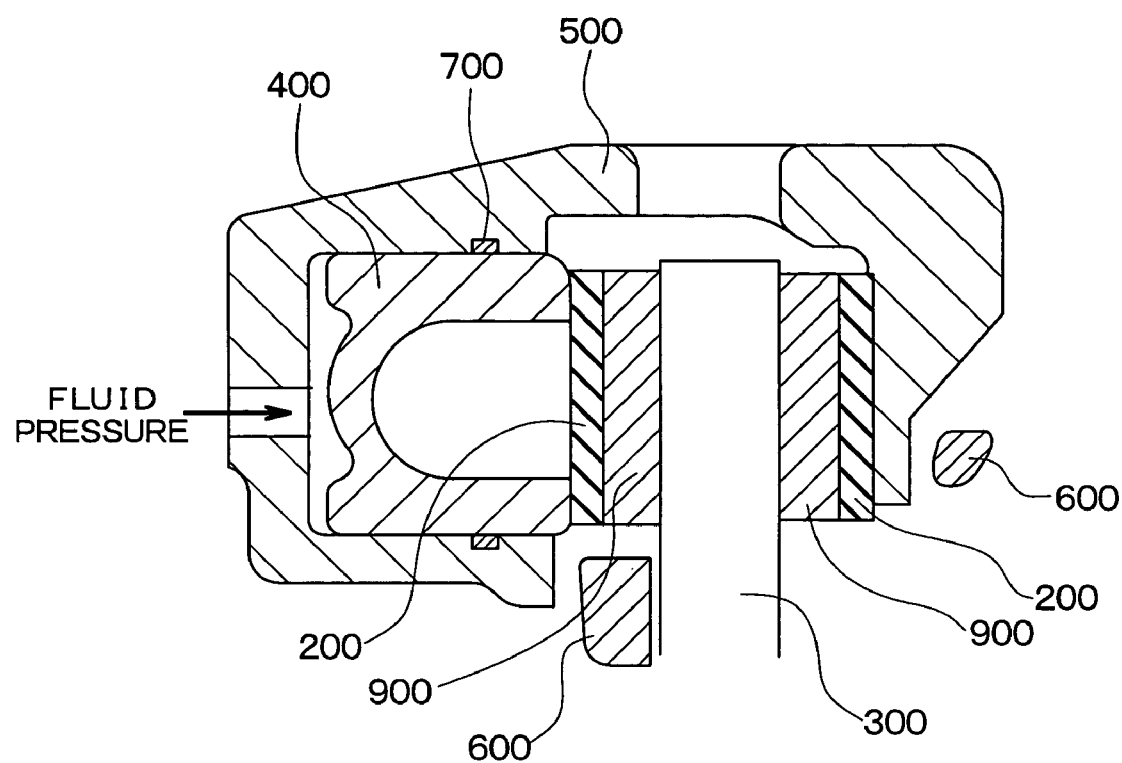
FIG. 11 shows disk brake pads that have been assembled to a brake.
Figure 12:
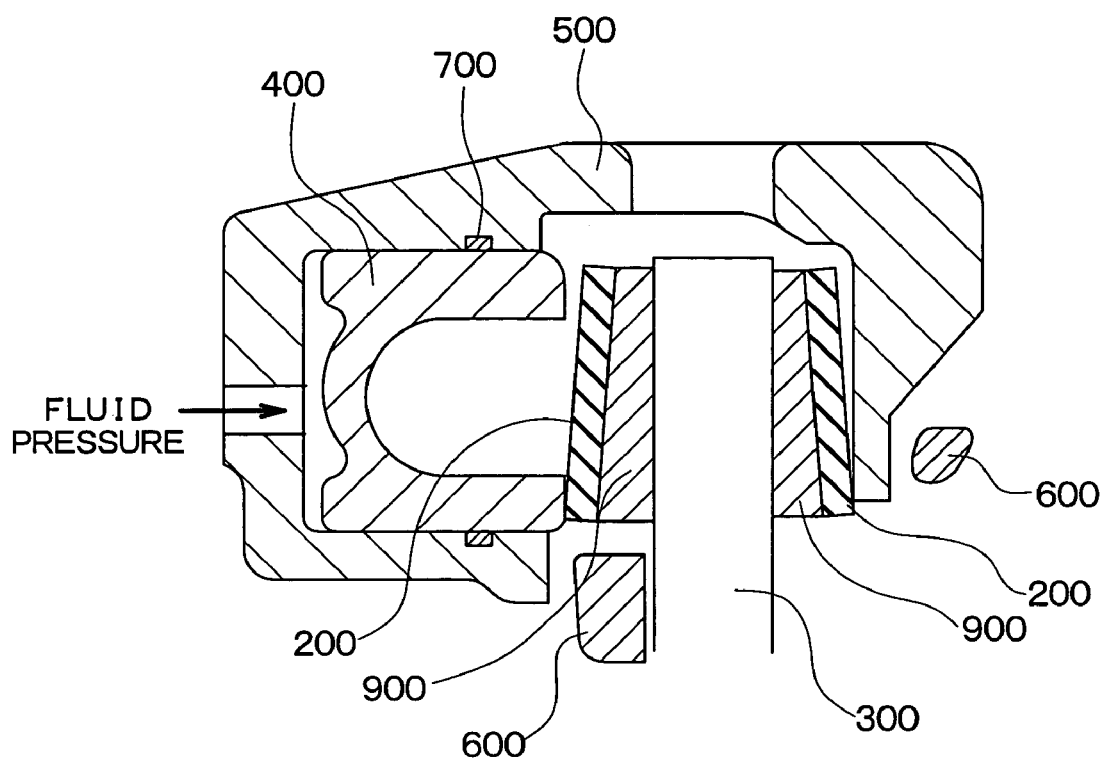
FIG. 12 shows the assembled brake of FIG. 11, in which uneven wear of the disk brake pads has occurred.

The disk brake pad 100 according to the present invention controls rotation of a disk rotor 300 by using a cylinder 500 and a piston 400 to push the friction surface 10 against the disk rotor 300 while it rotates, in the same manner as described previously for FIG. 11.

As can be seen from FIG. 1, the disk brake pad 100 is integrally formed with a back plate (back metal) 200. Note that, the disk brake pad 100 is fixed to the back plate 200 at a back surface that is on the opposite side of the disk brake pad 100 to the friction surface 10.

Figure 9A:
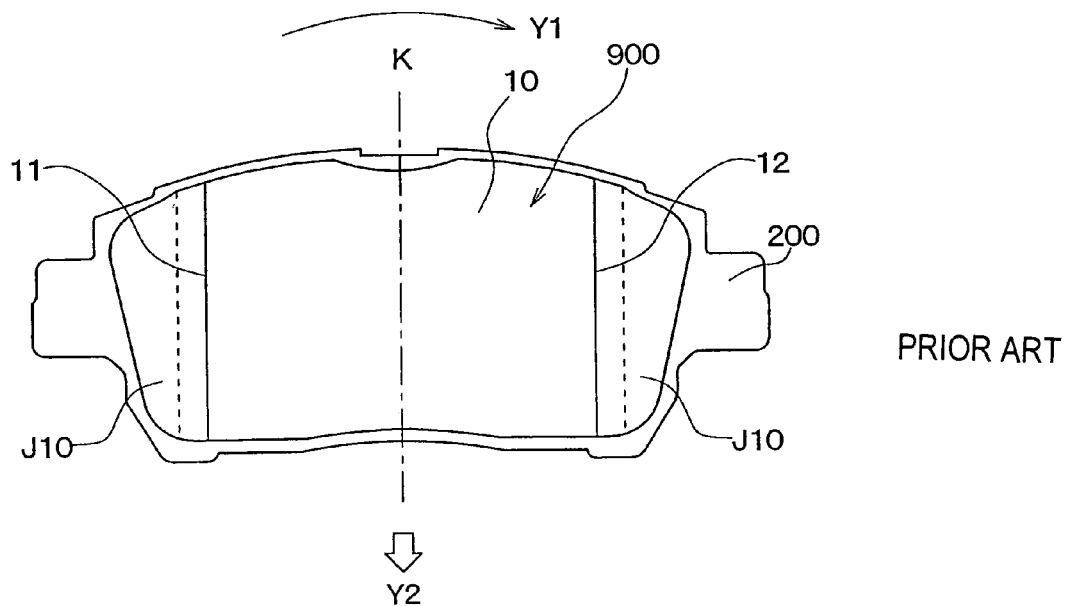
FIG. 9A is a schematic plane view showing the configuration of a conventional disk brake pad when viewed from the a front side of a friction surface 10 thereof.
Figure 9B:
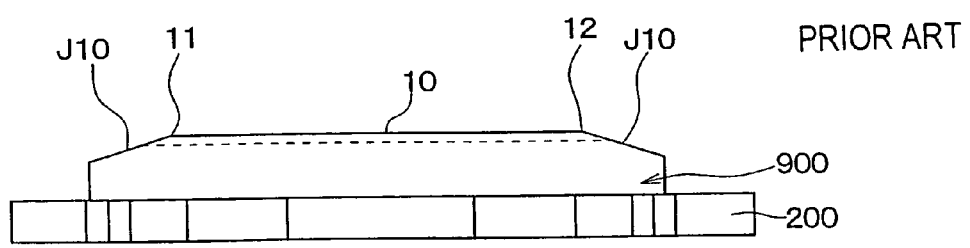
FIG. 9B is a side view showing the disk brake pad as viewed from the bottom of FIG. 9A.
Figure 10:
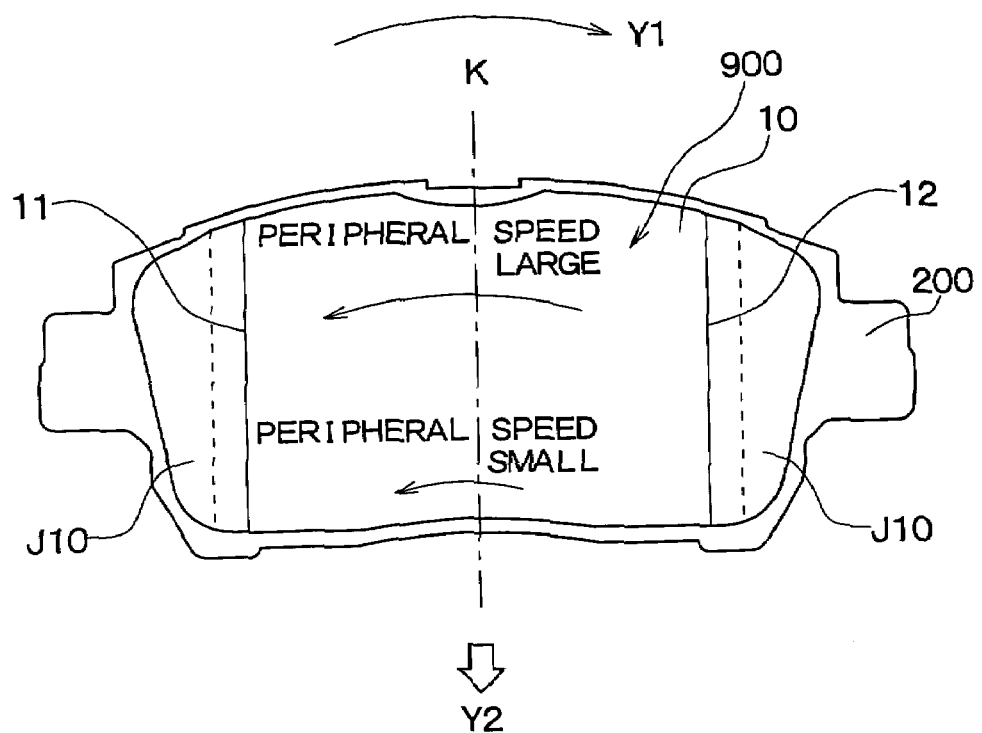
FIG. 10 is a schematic view that illustrates the causes of uneven wear of the disk brake pad in a rotation center direction of a disk rotor.

Further, in a similar manner to above described FIG. 9A, the arrow Y1 indicates a rotation direction of a disk rotor, not shown, namely, a disk rotor circumferential direction Y1. Note that, this disk rotor, although not shown in FIG. 1, is configured in the same manner as the disk rotor 300 shown in FIG. 11.

Moreover, in FIG. 1, the long-dash dot line K indicates a central axis K of the friction surface 10 that extends in radial direction of the disk rotor. Further, the arrow Y2 that is marked at the lower end of the long-dash dot line K indicates a direction toward a center of rotation of the disk rotor. Respective long-dash dot lines K' denote respective axes K' that are parallel to the central axis K of the friction surface 10.

In the embodiments described herein below, the direction indicated by the arrow Y1 will be referred to as the "disk rotor circumferential direction Y1". Further, the long-dash dot line K will be simply referred to as the "central axis K1" of the friction surface 10, and the direction indicated by the arrow Y2 will be referred to as the "disk rotor rotation center direction Y2".

In order to realize improved brake noise performance of the disk brake, the disk brake pad 100 is configured as shown in FIG. 1 so as to allow pad surface contact pressure to be regulated. The disk brake pad 100 is provided with respective chamfered portions 10a at an end portion of the disk brake pad 100 at an incoming disk-rotor-rotation side (namely, a leading side), and an end portion of the disk brake pad 100 at the outgoing disk-rotor-rotation side (namely, a trailing side).

Since the chamfered portions 10a are formed as described, edges 11 and 12 are respectively formed at the boundary edges of the friction surface 10 and the chamfered portions 10a. These edges 11 and 12 are respective edges of the end portions of the friction surface 10.

The respective edges 11 and 12 of the end portions of the friction surface 10 at the incoming and outgoing disk-rotor-rotation sides thereof are formed with a stepped bending shape such that a length of the friction surface 10 in the disk rotor circumferential direction Y1 becomes smaller toward the disk rotor rotation center (namely, in the disk rotor rotation center direction Y2).

This stepped bending shape, which can be seen in FIG. 1, will be described in more detail below.

The respective edges 11 and 12 that form the stepped bending shape of the friction surface 10 are formed from respective straight lines 11a and 12a, and 11b and 12b which form respective bend angles $\alpha$ and $\beta$ with respect to the central axis K of the friction surface 10.

Moreover, the bend angle $\alpha$ (a first angle $\alpha$) that is formed farther from the disk rotor rotation center is smaller than the bend angle $\beta$ (a second angle $\beta$) that is formed nearer to the disk rotor rotation center.

Note that, in FIG. 1, the bend angles $\alpha$ and $\beta$ are indicated as angles formed between the edges 11 and 12 of the friction surface 10 and the respective axis K' that are parallel to the central axis K of the friction surface 10. However, as will be clearly apparent, the indicated bend angles $\alpha$ and $\beta$ are definitionally equivalent to the definition of the bend angles $\alpha$ and $\beta$ given above. This explanation is also applicable to bend angles $\alpha$ and $\beta$ shown in FIGS. 3, 4, 5 and 6, which will be described later.

More particularly, as shown in the example of FIG. 1, the edges 11 and 12 formed with the stepped bending shape are formed from two steps, namely, a first-step formed by the respective straight lines 11a and 12a, and a second-step formed by the respective straight lines 11b and 12b. In other words, the respective edges 11 and 12 of the friction surface 10 are formed with a stepped bending shape that has a single bend point.

This shape is formed by chamfering the end portions of the friction surface 10 of the disk brake pad 100 so as to provide two chamfered portions 10a at both the end portion at the incoming disk-rotor-rotation side and the end portion at the outgoing disk-rotor-rotation side.

Of course, the edges 11 and 12 that form the stepped bending shape may be provided with a three-step bending shape (refer to FIG. 3 described later).

Next, an overall summary will be given concerning the features of the stepped bending shape of the edges 11 and 12 of the friction surface 10 shown in the example of FIG. 1.

The respective edges 11 and 12 of the end portions of the friction surface 10 at the incoming and outgoing disk-rotor-rotation sides thereof are formed with a stepped bending shape such that the length of the friction surface 10 in the disk rotor circumferential direction Y1 becomes smaller toward the disk rotor rotation center (namely, in the disk rotor rotation center direction Y2). The stepped bending shape is formed from two sets of lines, namely, the straight lines 11a and 11b, and 12a and 12b. Amongst these two sets of lines, if the first set of straight lines 11a and 12a are defined as being those farther from the disk rotor rotation center and the second set of straight lines 11b and 12b are defined as being those nearer to the disk rotor rotation center, then the first angle $\alpha$ formed between (i) the first set of straight lines 11a and 12a and (ii) the central axis K of the friction surface 10 is smaller than the second angle $\beta$ formed between (i) the second set of straight lines 11b and 12b and (ii) the central axis K of the friction surface 10.

In this example, both the bend angle $\alpha$ (the first angle $\alpha$ of this embodiment) formed farther from the disk rotor rotation center and the bend angle $\beta$ (the second angle $\beta$) formed closer to the disk rotor rotation center are angles of 90 degrees or less.

However, the bend angle $\alpha$ (the first angle $\alpha$ of this embodiment) formed farther from the disk rotor rotation center may be an angle within a range from zero to 45 degrees, whilst, on the other hand, the bend angle $\beta$ (the second angle $\beta$) formed closer to the disk rotor rotation center may be an angle within a range from 45 degrees to 80 degrees or less.

The disk brake pad 100 according to the embodiment described above is formed by: dry mixing a fiber material such as organic fiber, inorganic fiber, or metal fiber, with a powdered material such as a friction control agent or a filler, and a binding agent such as a binder resin like phenol resin; and then thermoforming the mixed material composition thereof.

It should be noted that, if metal fiber is used as the fiber material, steel fiber, copper fiber, brass fiber, or the like, may be used. Alternatively, if organic fiber is used, aramid fiber, carbon fiber, or the like, may be adopted. Further, when inorganic fiber is chosen, glass fiber, potassium titanate fiber, ceramic fiber, calcium silicate fiber, or the like, may be used.

Further, the friction control agent may be formulated from metal power, lubricant and inorganic oxide powder. More particularly, the metal powder may be selected from steel, copper, zinc, aluminum, bronze, brass, or the like; the lubricant may be selected from graphite, antimony disulfide, molybdenum disulfide, zinc disulfide, or the like; and, the inorganic oxide powder may be selected from silica, alumina, silicon carbide, zirconium oxide, zirconium silicate, or the like.

Moreover, as the filler, for example, it is normally possible to use a combination of inorganic filler and an organic filler. For example, for the inorganic filler, barium sulfate, calcium carbide, calcium hydroxide, mica, kaolin, talc, or the like, may be utilized. Further, for the organic filler, cashew dust, rubber dust, or the like, may be adopted.

Moreover, in the case of the binding agent, a generally known binder resin may be used. More specifically, normal-use powdered resins exemplified by phenolic resin, and further including resins such as urea resin, melamine resin, epoxy resin, urethane resin, polyimide resin, and modified resins thereof, may be utilized for the binding agent.

Figure 2:
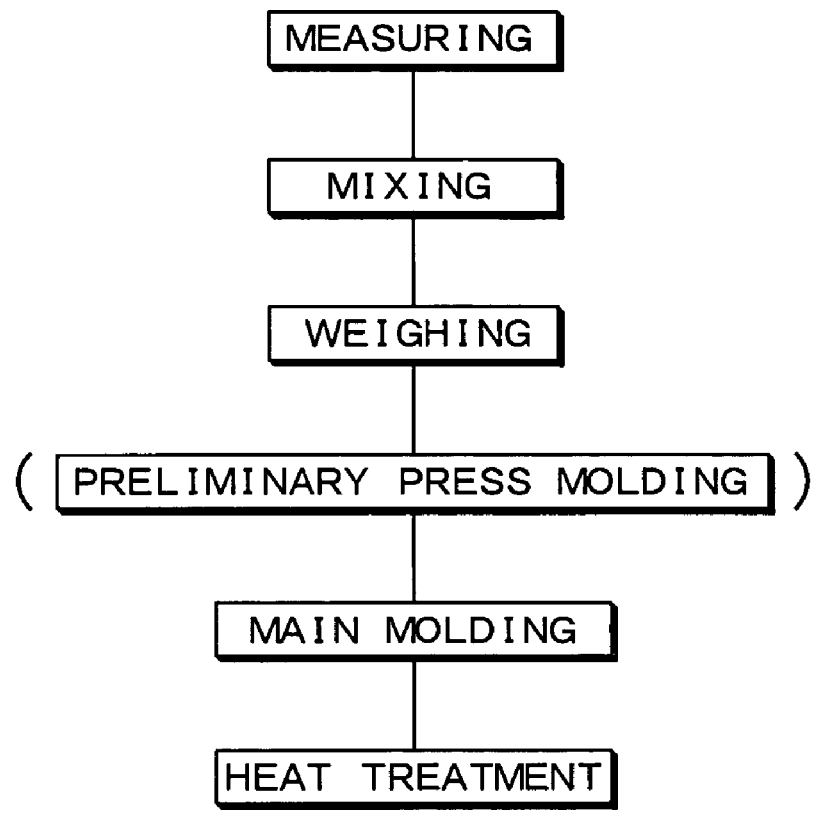
FIG. 2 is a process chart showing a manufacturing method for the disk brake pad according to the first embodiment.

The disk brake pad 100 according to this embodiment is manufactured using the manufacturing process illustrated in FIG. 2, in which a mixed material composition of the above described materials is used. FIG. 2 is a process chart illustrating the manufacturing method of the disk brake pad 100 according to this embodiment. The processes of this manufacturing method are described below.

Measuring:

First, the fiber material, the powdered material such as the friction control agent or the filler, and the binding agent are measured out at a predetermined composition ratio.

Mixing:

The measured material components are fed into a mixer in which they are dry mixed. Note that, the mixer may be any type of general use mixer, such as an Eirich mixer. By the end of this process, a material composition consisting of the organic material, the powdered material such as the friction control agent or the filler, and the binding agent is made.

Weighing:

Next, the material composition is removed from the mixer, and then divided into predetermined amounts by weighing.

Then, each divided-up predetermined amount of the material composition is fed into a metal mold tool, and thermoforming is begun. Here, in order to make the divided-up predetermined amounts of the material composition into block form, so-called "preliminary press molding" is performed using a separate mold tool so as to preliminarily mold the material composition prior to the main molding.

Main Molding:

In the main molding, the divided-up material composition or the preliminarily pressed molded divided-up material composition is fed into a metal mold tool that has been heated up to, for example, 160 degrees. The material composition is then pressed, and a molded compact formed.

At this time, following feeding of the material composition into the metal mold tool, the back plate 200 is attached to the metal mold tool so as to cover a mouth thereof. Accordingly, the produced molded compact and the back plate 200 are integrally formed by the pressure thermoforming.

Heat Treatment:

Next, the molded compact produced by the main molding is hardened by heat treatment at, for example, 200 degrees or more. With the completion of this process, the manufacture of the disk brake pad 100 integrated with the back plate 200 is finished.

With this type of manufacturing method, the chamfered portions 10a may be formed by cutting the disk brake pad 100 after hardening, or alternatively, may be formed by using the metal mold tool to form the disk brake pad 100 such that it is provided with a shape that corresponds to the chamfered portion 10a.

According to this embodiment, the disk brake pad 100 controls rotation of the disk rotor 300 by pushing the friction surface 10 against the disk rotor 300 while it is rotating, as described previously. The disk brake pad 100 is formed with the chamfered portions 10a at the respective end portions of the disk brake pad 100 at the incoming and outgoing disk-rotor-rotation sides thereof. The characteristics of this disk brake pad 100 are as described below.

The key characteristic of the disk brake pad 100 is that the respective edges 11 and 12 of the end portions of the friction surface 10 at the incoming and outgoing disk-rotor-rotation sides thereof are formed with the stepped bending shape such that the length of the friction surface 10 in the disk rotor circumferential direction Y1 becomes smaller toward the disk rotor rotation center.

With this configuration, the length of the friction surface 10 in the circumferential direction Y1 becomes smaller toward the disk rotor rotation center. Accordingly, the disk brake pad 100 of this embodiment is formed such that the friction surface 10 has a fan-shape like that of the disk brake pad shown in FIGS. 13A and 13B. Thus, the disk brake pad 100 can facilitate even distribution of work across the friction surface 10 in the disk rotor rotation center direction Y2.

Further, the respective edges 11 and 12 of the end portions of the friction surface 10 at the incoming and outgoing disk-rotor-rotation sides are formed in the stepped bending shape. Accordingly, as compared to the above described fan-shaped configuration in which the edges 11 and 12 of the respective end portions (refer to FIG. 13A) are single straight lines, it is possible to provide the disk brake pad 100 of this embodiment with a wider surface area at a portion (which is subject to comparatively severe wear) that is far from the disk rotor rotation center.

Figure 13A:
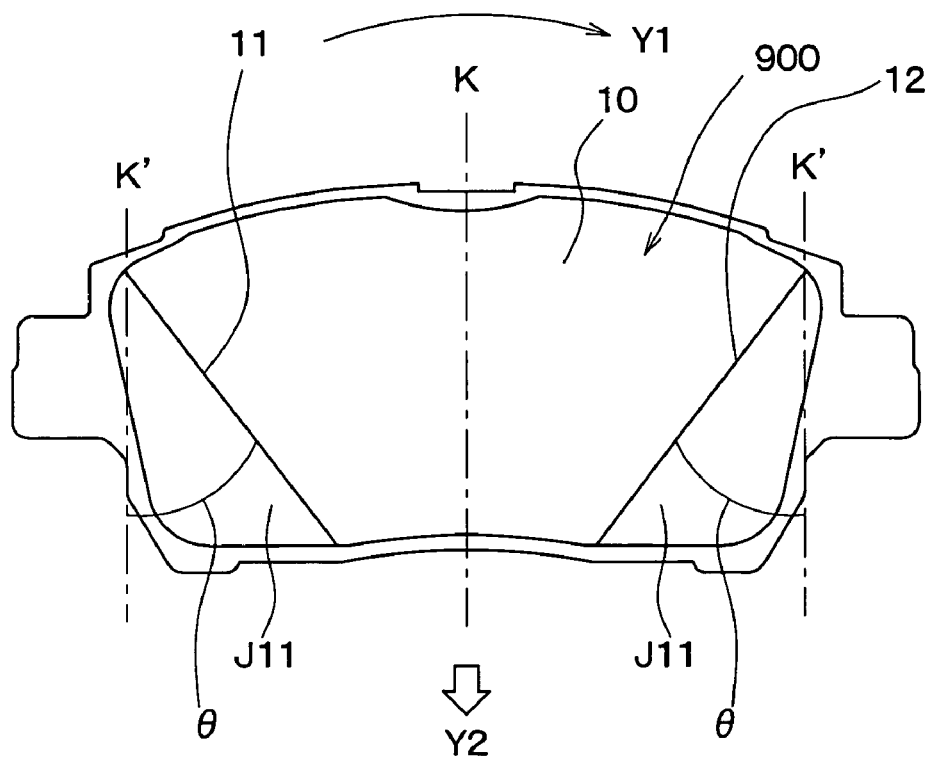
FIG. 13A is a schematic plane view showing the configuration of a disk brake pad having a fan-shaped configuration when the disk brake pad is viewed from a front side of a friction surface thereof.
Figure 13B:
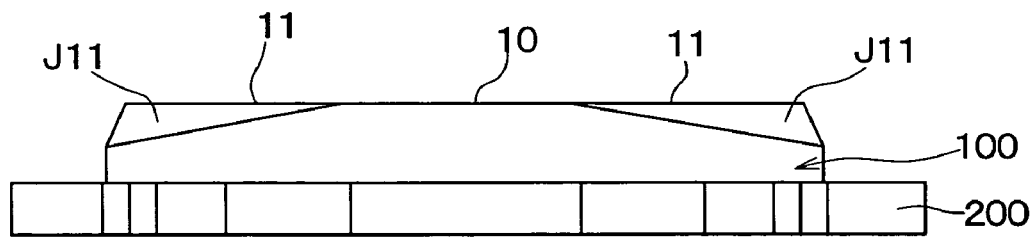
FIG. 13B is a side view showing the disk brake pad as viewed from the bottom of FIG. 13A.

This difference in the surface area of the friction surface 10 will be clearly apparent from comparison of FIGS. 13A and 13B that shows the disk brake pad 900 with the fan-shaped friction surface 10, and the disk brake pad 100 of this embodiment that is shown in FIG. 1.

Thus, the disk brake pad 100 according to this embodiment effectively helps to promote long pad-life and inhibits uneven pad-wear from occurring in the disk rotor rotation center direction.

Moreover, the disk brake pad 100 shown in FIG. 1 effectively embodies a configuration with the above characteristics, which facilitate achievement of the described effects. More particularly, the disk brake pad 100 shown in FIG. 1 has the following characteristics.

The respective edges 11 and 12 of the end portions of the friction surface 10 at the incoming and outgoing disk-rotor-rotation sides thereof are formed with the stepped bending shape.

Among the bend angles $\alpha$ and $\beta$ of the edges 11 and 12 that form the stepped bending shape, the angle that is formed closer to the disk rotor rotation center is set to be larger than the angle that is formed farther from the disk rotor rotation center.

In this way, the configuration is provided with the stepped bending shape formed by the edges 11 and 12 of the friction surface 10 which have the bend angle $\alpha$ formed farther from the disk rotor rotation center that is smaller than the bend angle $\beta$ formed nearer to the disk rotor rotation center. Accordingly, this configuration effectively embodies the characteristics of the embodiment.

Note that, in the example shown in FIG. 1, the edges 11 and 12 of the friction surface 10 that form the stepped bending shape are provided so as to have a two-step bending shape formed by the first set of straight lines 11a and 12a, and the second set of straight lines 11b and 12b. In other words, a single bend point configuration is adopted.

With this embodiment, it is sufficient if the edges 11 and 12 of the friction surface 10 are provided with a stepped bending shape as described above. Accordingly, the stepped bending shape may be provided with three, four, or even more steps, instead of the two-step configuration described.

Figure 3:
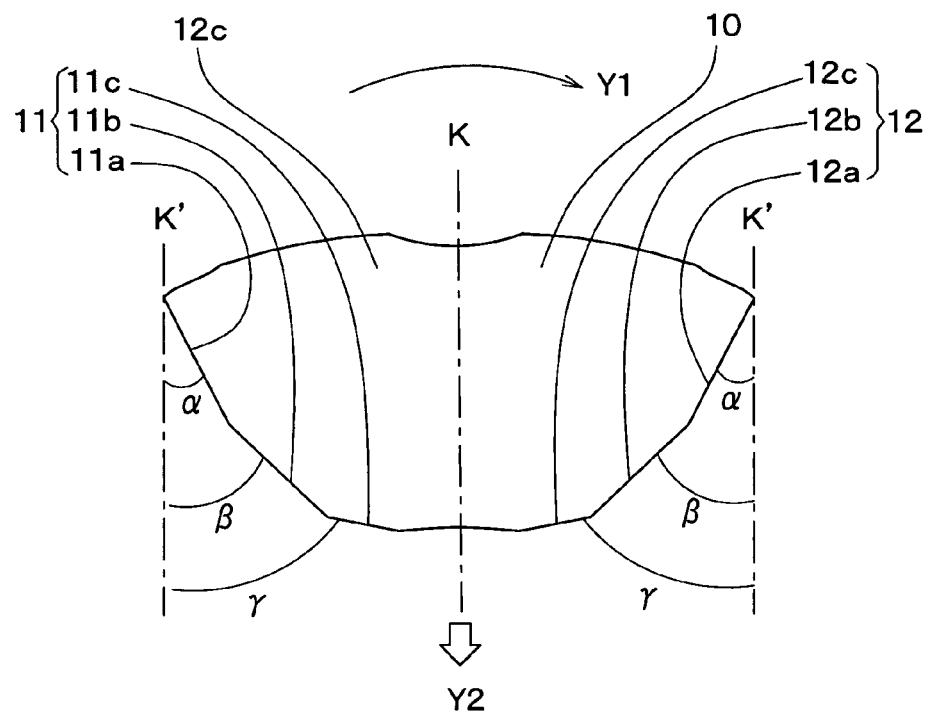
FIG. 3 is a schematic plan view of a friction surface of a first modified form of the disk brake pad of the first embodiment.

FIG. 3 shows a plan view of the configuration of a first modified form of the friction surface 10 of the above embodiment. In this first modified form, the disk brake pad 100 is provided with a three-step bending shape formed by the edges 11 and 12 of the friction surface 10.

With the disk brake pad 100 shown in FIG. 3, three chamfered portions (not shown) are provided at each side of the disk brake pad 100 such that a three-step bending shape is formed from three sets of straight lines that make up the edges 11 and 12 of the friction surface 10.

More particularly, the three-step bending shape is formed from the first set of straight lines 11a and 12a, the second set of straight lines 11b and 12b, and the third set of straight lines 11c and 12c which run in order from respective points that are far from the disk rotor rotation center. In other words, as can be seen from the example of FIG. 3, a double bend point configuration is adopted.

Next, the relationship of three bend angles $\alpha$, $\beta$ and $\gamma$ will be described. The bend angle (first angle) $\alpha$ is formed between the first straight lines 11a and 12a and the central axis K of the friction surface 10; the bend angle (second angle) $\beta$ is formed between the second straight lines 11b and 12b and the central axis K of the friction surface 10; and the bend angle (third angle) γ is formed between the third straight lines 11c and 12c and the central axis K of the friction surface 10. These bend angles α, β and γ become larger from the angle α that is formed far from the disk rotor rotation center toward the angle γ that is formed closer to the disk rotor rotation center. In other words, the relationship of the three bend angles α, β and γ is: α<β<γ.

Moreover, it is sufficient if the edges 11 and 12 of the friction surface 10 form a stepped bending shape such that the length of the friction surface 10 in the disk rotor circumferential direction Y1 becomes shorter toward the disk rotor rotation center. Thus, in distinction to the examples shown in FIGS. 1 and 3, the bend angles do not necessarily need to be formed such that they are larger nearer to the disk rotor rotation center than farther therefrom.

Figure 4:
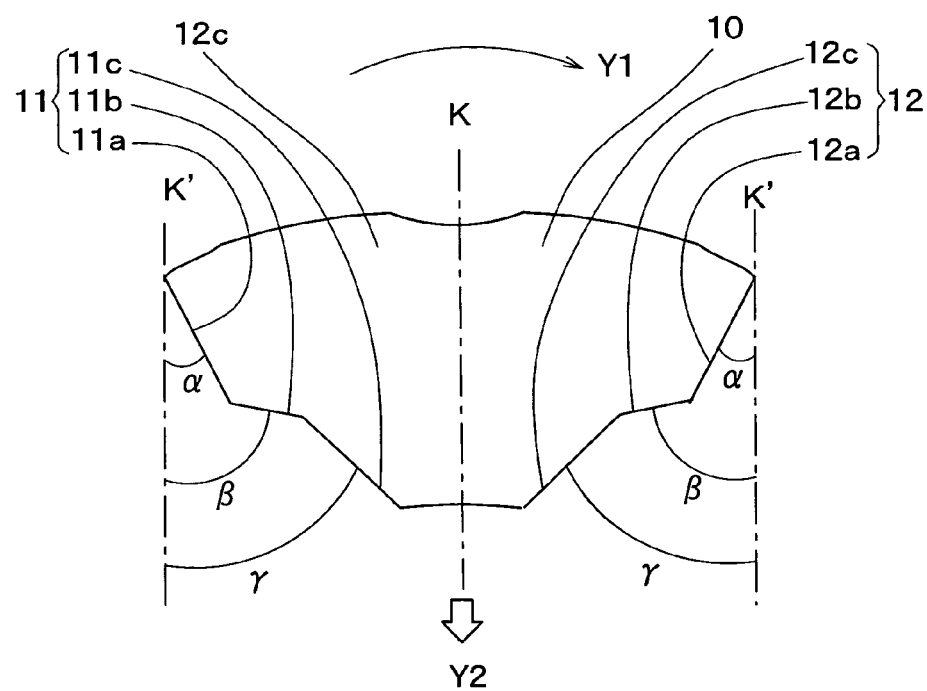
FIG. 4 is a schematic plan view of a friction surface of a second modified form of the disk brake pad of the first embodiment.

An example of such a configuration is shown in FIG. 4, which shows a second modified form of the first embodiment. The disk brake pad shown in FIG. 4 is provided with a bending shape that is formed by the edges 11 and 12 of the friction surface 10 which have three sets of straight lines 11a to 11c and 12a to 12c, in a similar manner to FIG. 3 above.

Note that, in this example, a second angle β that is formed farther from the disk rotor rotation center is larger than a third angle γ that is formed closer to the disk rotor rotation center. In other words, the relationship of the three bend angles α, β and γ is α<β>γ.

Second Embodiment

The second embodiment of the present invention is a modified form of the above described first embodiment. Accordingly, the following description will mainly focus on points of difference between the two embodiments.

Figure 5A:
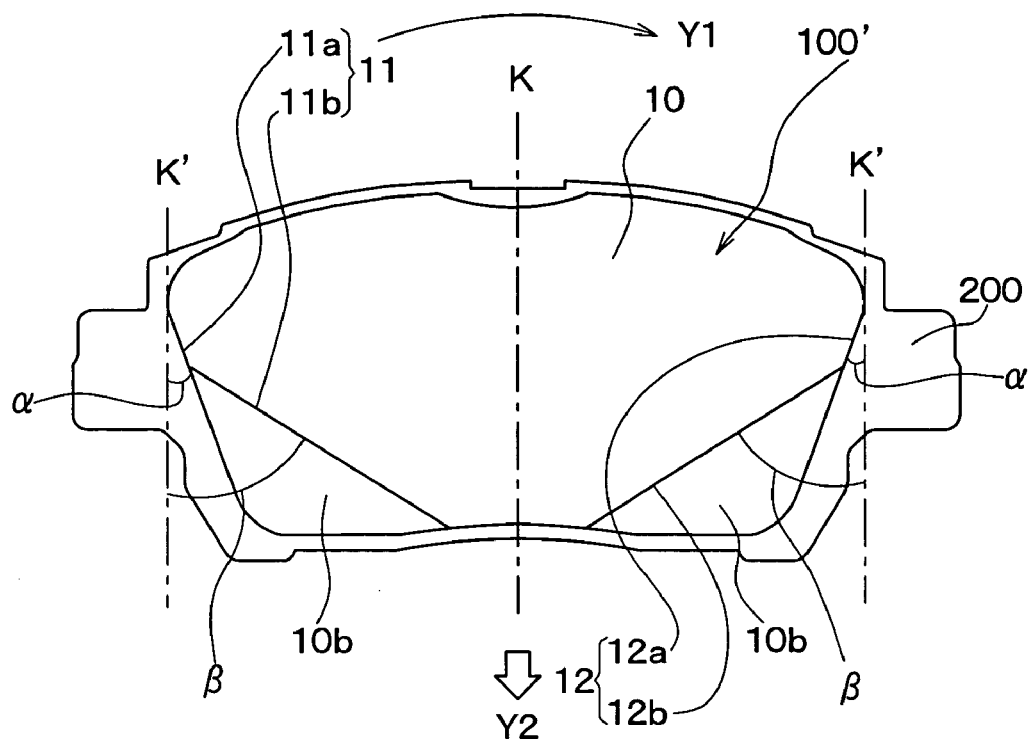
FIG. 5A is a schematic plane view showing the configuration of a disk brake pad according to a second embodiment of the present invention.
Figure 5B:
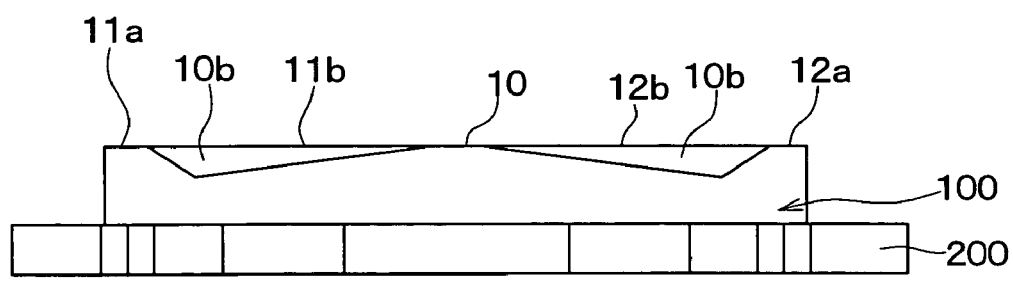
FIG. 5B is a side view of the disk brake pad as viewed from the bottom of FIG. 5A.

FIGS. 5A and 5B show the configuration of a disk brake pad 100' according to the second embodiment. FIG. 5A shows a schematic plan view of the disk brake pad 100' when viewed from a front of the friction surface 10, and FIG. 5B shows a side view of the disk brake pad 100' as viewed from the bottom of FIG. 2A.

The friction surface 10 of the disk brake pad 100' is formed with a fan-shape. With this disk brake pad 100', an external periphery portion of the fan-shaped friction surface 10 directly forms the portion of the friction surface 10 that is farther from the disk rotor rotation center. Further, an inner periphery portion of the fan-shaped friction surface 10 directly forms the portion of the friction surface 10 that is closer to the disk rotor rotation center.

In other words, in FIG. 5A, a circumferential direction Y1 of the fan-shaped friction surface 10 is substantially the same as the disk rotor circumferential direction Y1. The central axis K of the friction surface 10 that extends in radial direction of the fan of the fan-shaped friction surface 10 is substantially the same as the central axis K of the friction surface 10.

Further, a main characteristic of this embodiment is that chamfering is performed so as to provide chamfered portions 10b at the inner periphery portion of the fan formed by the edges 11 and 12 of both end portions of the friction surface 10 in the circumferential direction Y1. These chamfered portions 10b are provided such that a length of the inner peripheral portion of the fan becomes shorter in the circumferential direction Y1.

Accordingly, the disk brake pad 100' has the friction surface 10 formed in the fan shape, and as with the disk brake pad 100 of the first embodiment, a configuration is realized in which the length of the friction surface 10 in the circumferential direction Y1 of the disk rotor becomes shorter toward the disk rotor rotation center.

Thus, the disk brake pad 100' of this embodiment can facilitate even distribution of work across the friction surface 10 in the disk rotor rotation center direction Y2.

Moreover, with the configuration of this embodiment, the chamfered portions 10b are provided at the inner periphery portion of the fan formed by the edges 11 and 12 of both end portions of the friction surface 10 in the circumferential direction Y1 such that the length of the inner peripheral portion of the fan becomes shorter in the circumferential direction Y1. Accordingly, this configuration does not require chamfered portions to be provided at the external peripheral portion of the fan.

Accordingly, with this configuration, the external periphery portion of the fan, namely, the portion of the friction surface 10 that is farther from the disk rotor rotation center (which is subject to comparatively severe wear), can be formed with a wider surface area.

In other words, it is clearly apparent that the disk brake pad 100' with the fan-shaped friction surface 10 of this embodiment, like the first embodiment described above, is provided with a configuration in which the stepped bending shape is formed by the edges 11 and 12 of the friction surface 10 such that the length of the friction surface 10 in the circumferential direction Y1 of the disk rotor becomes shorter toward the disk rotor rotation center.

Thus, according to this embodiment as well, the disk brake pad 100' effectively helps to promote long pad-life and inhibits uneven pad-wear from occurring in the disk rotor rotation center direction.

Note that, in the example of FIGS. 5A and 5B, each end portion of the disk brake pad 100' is provided with just one of the chamfered portions 10b. Further, the boundary edges of the respective chamfered portions 10b are formed by single straight lines 11b and 12b.

Note that, in this example, rather than an angle α being formed at the chamfered portions 10b of the edges 11 and 12 of the end portions of the friction surface 10 in the circumferential direction, the angle α is formed between the straight lines 11a and 12a that are formed at the external periphery portion of the fan and the central axis K of the friction surface 10 that extends in radial direction of the fan. This angle α will be defined as first angle α.

Moreover, an angle β is formed between the straight lines 11b and 12b of the chamfered portions 10b and the central axis K of the friction surface 10 that extends in radial direction of the fan. This angle β will be defined as second angle β

Given this configuration, the first angle α is smaller than the second angle β. In other words, the relationship of the angles α and β is: α<β. Accordingly, the configuration as shown in FIGS. 5A and 5B is substantially equivalent to the configuration shown in FIG. 1, in which the edges 11 and 12 have a single bend point.

Note that, this embodiment, like the example shown in FIG. 3, may be provided with two sets of respective chamfered portions for the edges 11 and 12 of the friction surface 10. Accordingly, a double bend point configuration may be adopted such that the edges 11 and 12 have a three-step bending shape. It will of course be clearly apparent that a four-step bending shape may be adopted for the edges 11 and 12.

Moreover, in this embodiment as well, for example, if the edges 11 and 12 of the friction surface 10 are provided with the three-step bending shape, as shown in the example of FIG. 4, the bend angles do not necessarily need to be formed so as to become progressively larger closer to the disk rotor rotation center.

Figure 6:
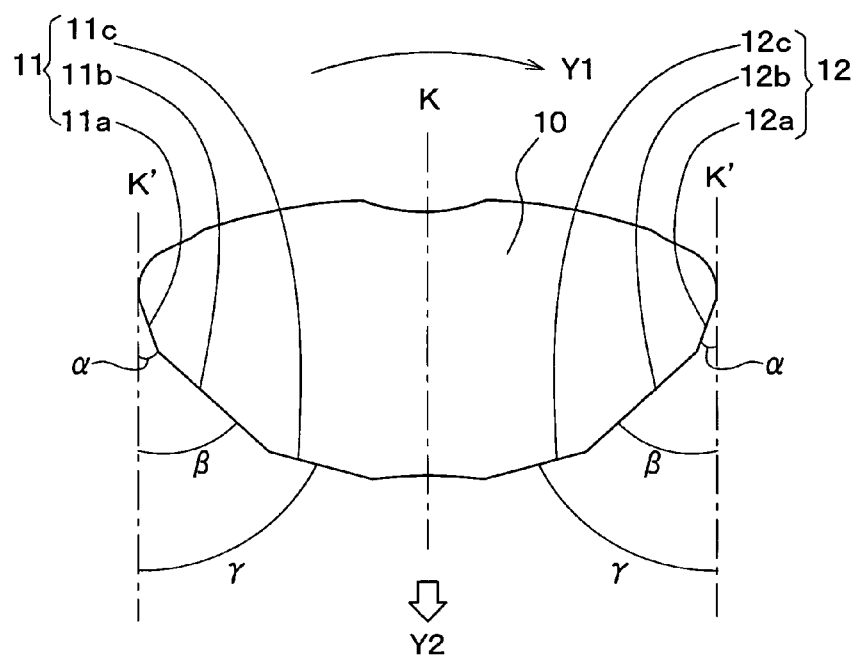
FIG. 6 is a schematic plan view of a friction surface of a first modified form of the disk brake pad of the second embodiment.

An example of such a configuration is shown in FIG. 6, which shows a first modified form of the second embodiment. The disk brake pad shown in FIG. 6, like that in FIG. 4, has the fan-shaped friction surface 10 with the edges 11 and 12 that are formed from three sets of straight lines 11a and 12a, 11b and 12b, 11c and 12c so as to have a bending shape.

However, in the example of FIG. 6, the second angle β that is formed farther from the disk rotor rotation center is larger than a third angle γ that is formed closer to the disk rotor rotation center. In other words, the relationship of the three bend angles α, β, and γ: α<β>γ.

Figure 7:
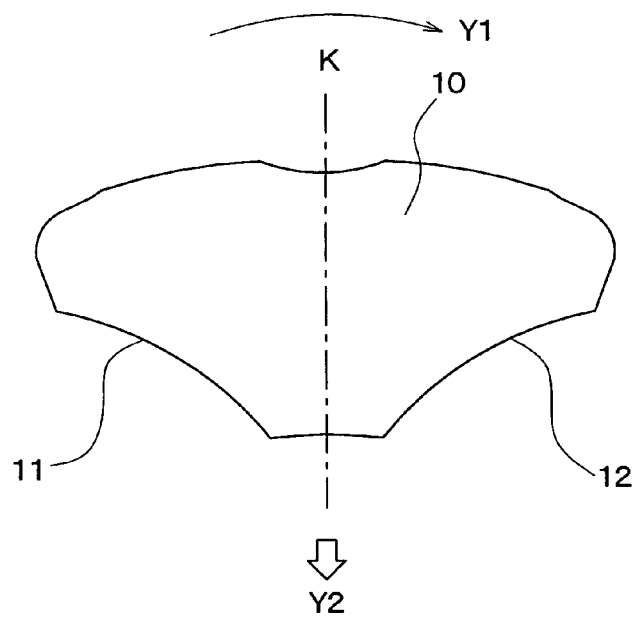
FIG. 7 is a schematic plan view of a friction surface of a second modified form of the disk brake pad of the second embodiment.

Further, FIG. 7 shows a second modified form of the second embodiment, in which a schematic plan view of a disk brake pad is shown.

As can be seen from the disk brake pad of FIG. 7, the stepped bending shape of the edges 11 and 12 of the friction surface 10 need not be entirely formed from straight lines that link the bend points. Instead, at least some of the lines may be curved lines. Note that, this modification may also be adopted for the first embodiment.

Other Embodiments

Figure 8A:
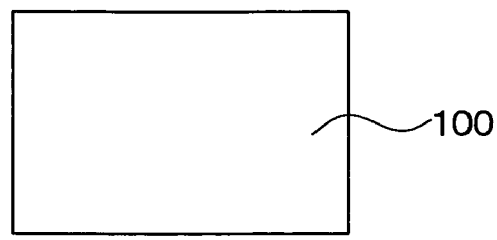
FIGS. 8A to 8C show respective plane surface shapes of different types of disk brake pads that may be used with the present invention when a chamfered portion is not provided on the disk brake pad.
Figure 8B:
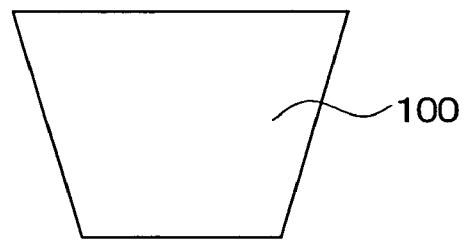

FIGS. 8A and 8B show respective plane surface shapes of different types of disk brake pad that may be used with the present invention when a chamfered portion is not provided on the disk brake pad.

FIG. 8A shows a disk brake pad that has a generally rectangular shape; FIG. 8B shows a disk brake pad which is generally a trapezoid shape, and which is primarily suitable for use in the first embodiment; and FIG. 8C shows a disk brake pad which is generally fan-shaped, and which is primarily suitable for use in the second embodiment.

Figure 8C:
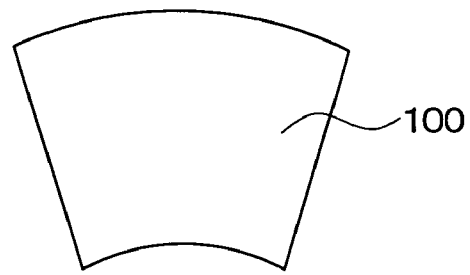

Further, with the disk brake pads shown in FIGS. 8A to 8C, the respective bend points of the friction surfaces 10 are formed by the respective corner points. However, these corner points may of course be made less sharp, or, in other words, rounded-off.

While the above description is of the preferred embodiments of the present invention, it should be appreciated that the invention may be modified, altered, or varied without deviating from the scope and fair meaning of the following claims.

What is claimed is:

1. A disk brake pad that controls rotation of a disk rotor by pushing a friction surface of the disk brake pad against the disk rotor while the disk rotor is rotating, the friction surface being the planar surface on which the disk rotor slides, the disk brake pad being formed with respective chamfered portions at an end portion of the disk brake pad at an incoming disk-rotor-rotation side and an end portion of the disk brake pad at an outgoing disk-rotor-rotation side, wherein an edge of an end portion of the friction surface at the incoming disk-rotor-rotation side and an edge of an end portion of the friction surface at the outgoing disk-rotor-rotation side are both formed so that a length of the friction surface in a circumferential direction of the disk rotor decreases toward a center of rotation of the disk rotor, and the edges are formed in a stepped bending shape such that the length of the friction surface in the circumferential direction of the disk rotor decreases from an outer circumference of the friction surface between the edges of the end portions to an inner circumference of the friction surface between the edges of the end portions.

2. The disk brake pad according to claim 1, wherein the stepped bending shape is formed as a two-step bending shape formed by a first set of straight lines and a second set of straight lines.

3. The disk brake pad according to claim 1, wherein the length of the friction surface in the circumferential direction does not increase from the outer circumference to the inner circumference.

4. A disk brake pad that controls rotation of a disk rotor by pushing a friction surface of the disk brake pad against the disk rotor while the disk rotor is rotating, the friction surface being the planar surface on which the disk rotor slides, the disk brake pad being formed with respective chamfered portions at an end portion of the disk brake pad at an incoming disk-rotor-rotation side, wherein an edge of an end portion of the friction surface at the incoming disk-rotor-rotation side and an edge of an end portion of the friction surface at the outgoing disk-rotor-rotation side are formed in a stepped bending shape, the stepped bending shape having respective bend angles formed between respective straight lines of the edges and a central axis of the friction surface that extends in radial direction of the disk rotor, when the angles are defined as being respective bend angles, the bend angles are set such that the bend angle formed nearer to a center of rotation of the disk rotor is larger than the bend angle formed farther from the center of rotation of the disk rotor, wherein a length of the friction surface in a circumferential direction of the disk rotor decreases from an outer circumference of the friction surface between the edges of the end portions to an inner circumference of the friction surface between the edges of the end portions.

5. The disk brake pad according to claim 4, wherein the bend angles are set at ninety degrees or less.

6. The disk brake pad according to claim 5, wherein the stepped bending shape is formed as a two-step bending shape formed by a first set of straight lines and a second set of straight lines.

7. The disk brake pad according to claim 4, wherein the stepped bending shape is formed as a two-step bending shape formed by a first set of straight lines and a second set of straight lines.

8. A disk brake pad that controls rotation of a disk rotor by pushing a friction surface of the disk brake pad against the disk rotor while the disk rotor is rotating, the friction surface being the planar surface on which the disk rotor slides, the disk brake pad being formed with respective chamfered portions at an end portion of the disk brake pad at an incoming disk-rotor-rotation side and an end portion of the disk brake pad at an outgoing disk-rotor-rotation side, wherein an edge of an end portion of the friction surface at the incoming disk-rotor-rotation side and an edge of an end portion of the friction surface at the outgoing disk-rotor-rotation side are formed in a stepped bending shape that is formed from two pairs of straight lines, the stepped bending shape being formed such that a length of the friction surface in a circumferential direction of the disk rotor becomes shorter toward a center of rotation of the disk rotor, when among the two pairs of straight lines, the straight lines farther from the center of rotation of the disk rotor are defined as being a first set of straight lines, and the straight lines nearer to the center of rotation of the disk rotor are defined as being a second set of straight lines, a first angle formed between the first set of straight lines and a central axis of the friction surface that extends in radial direction of the disk rotor is set to be smaller than a second angle formed between the second set of straight lines and the central axis of the friction surface, wherein the length of the friction surface in the circumferential direction of the disk rotor decreases from an outer circumference of the friction surface between the edges of the end portions to an inner circumference of the friction surface between the edges of the end portions.

9. The disk brake pad according to claim 8, wherein the first angle is set within a range between zero and forty-five degrees, and the second angle is set within a range from forty-five degrees to eighty degrees.

10. A disk brake pad that controls rotation of a disk rotor by pushing a friction surface against the disk rotor while the disk rotor is rotating, the friction surface being the planar surface on which the disk rotor slides, wherein the friction surface is formed in a fan-shape, and an inner periphery side portion of the fan-shape which is formed by respective edges of respective end portions of the friction surface in a circumferential direction is provided with chamfered portions that are chamfered such that a length of the friction surface across the inner peripheral side portion of the fan-shape becomes shorter in the circumferential direction, and the length of the friction surface in the circumferential direction of the disk rotor decreases from an outer circumference of the friction surface between the edges of the end portions to an inner circumference of the friction surface between the edges of the end portions.

11. The disk brake pad according to claim 10, wherein the respective edges of the chamfered portions are formed as single straight-lines, and when an angle formed between (i) straight lines which are located at a portion of the fan-shape that is farther to an external periphery side of the fan-shape than the chamfered portions and which form part of the edges of respective end portions of the friction surface in the circumferential direction, and (ii) a central axis of the friction surface that extends in radial direction of the fan-shape is defined as a first angle, and an angle formed between (i) straight lines that form the edges of the chamfered portions and (ii) the central axis of the friction surface that extends in radial direction of the fan-shape is defined as a second angle, the first angle is set to be smaller than the second angle.

* * * * *